Oct. 18, 1955  F. M. EXNER  2,721,276
CONDITION SENSING APPARATUS
Filed Nov. 19, 1952
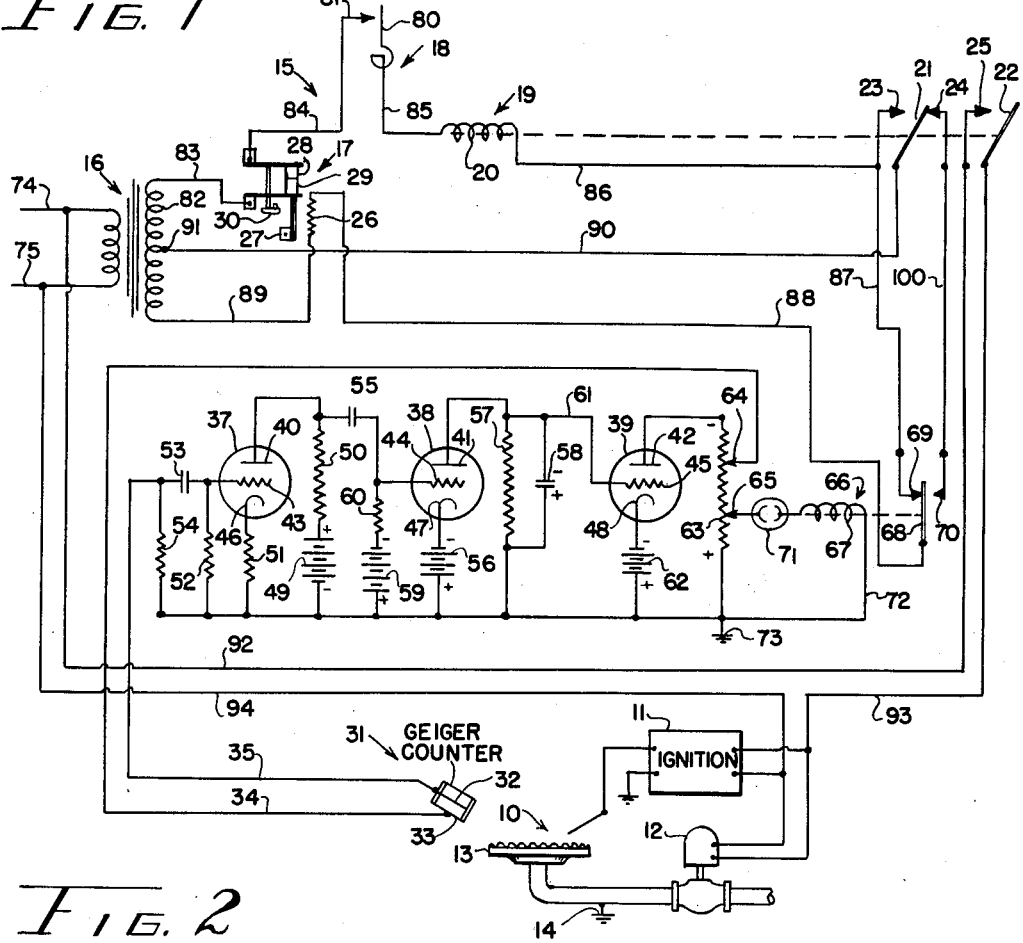
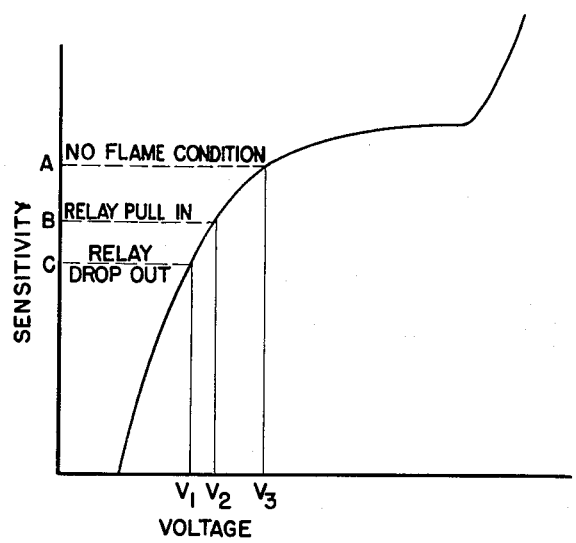
INVENTOR.
FRANK M. EXNER
BY George H. Fisher
ATTORNEY United States Patent Office 2,721,276
Patented Oct. 18, 1955

2,721,276

CONDITION SENSING APPARATUS

Frank M. Exner, Minneapolis, Minn., assignor to Minneapolis-Honeywell Regulator Company, Minneapolis, Minn., a corporation of Delaware Application November 19, 1952, Serial No. 321,317

10 Claims. (Cl. 250—83.6)

The present invention is concerned with a new and improved condition sensing apparatus making use of a sensing element and providing means whereby the operating voltage of the sensing element is varied in accordance with the condition to which the element is subjected. In particular, the present invention is shown as applied to an electric flame detector making use of a sensing element of the gaseous discharge type, such as a Geiger tube, in which a discharge takes place upon the element being subjected to the wave energy emitted by a flame.

In prior art sensing devices using Geiger tubes great pains are taken to provide a constant voltage source for supplying the tube. Due to the characteristics of the tube it is desirable to select this voltage such that the tube operates on what is called the plateau of its characteristic curve. It is in this region that the tube is stable and variations in supply voltage have little effect upon the output of the tube.

A higher voltage which will take the tube off of the plateau will place the tube in a very undesirable region in which almost a continuous discharge takes place independent of ionizing events passing through the tube. This uncontrolled discharge tends to destroy the tube's useful characteristics.

If the voltage is lowered, the tube operates on a very steep portion of the characteristic curve. This is undesirable for applications requiring quantitative information because in this condition a small change in supply voltage for the tube causes a great change in the characteristic of the tube.

Further, if the power supply for a Geiger tube is well regulated and selected so that the tube operates on the plateau of its characteristic, it is possible that aging of the tube will change its characteristics sufficiently to shift the operating point of the tube to the undesirable portion above or below the plateau.

When a Geiger tube is operated consistently on the plateau, a relatively high operating voltage is applied to the tube. It is a characteristic of a Geiger tube that the magnitude of the pulses of electric charge which pass through the tube increases with the voltage applied to the tube. It is also known that the life of the tube is shortened by allowing relatively large pulses to pass through it. However, the sensitivity, or counting rate for a given condition, also increase with the voltage applied to the tube. Therefore, in prior art devices a compromise was made between tube life and sensitivity desired. The present invention proposes a detecting system for application in which quantitative information is not required. In this system the operating point of the Geiger tube need not be restricted to the plateau.

It is therefore an object of the present invention to provide a condition sensing apparatus which makes use of an amplifier controlled by a Geiger tube, with the output of the amplifier supplying the operating voltage for the Geiger tube such that with no ionizing events passing through the tube the operating point of the tube is at or near the beginning of the plateau of its characteristic and when ionizing events pass through the tube the operating voltage is lowered so that the tube is kept sensitive to the condition to which it is subjected but the current passing through the tube is lowered to give longer tube life.

It is a further object of the present invention to provide a condition sensing apparatus in which a Geiger tube supplies the input signal to an amplifier whose output supplies the operating voltage for the Geiger tube so that the normal operating point of the tube is automatically adjusted to follow changes in the tube characteristic due to aging.

It is a further object of the present invention to provide an improved condition sensing means having an electronic amplifier whose input signal is furnished by a circuit including a photosensitive Geiger tube sensing element and whose output voltage is both the supply voltage for the Geiger tube and the voltage indicative of the condition to which the Geiger tube is subjected.

It is another object of the present invention to provide an improved condition sensing device having an electronic amplifier whose input signal is supplied by a gaseous discharge element when the element is exposed to a condition to be sensed and whose output voltage is the supply voltage for the sensing element, with the amplifier functioning to lower the sensing element supply voltage upon an input signal being supplied to the amplifier, this lower voltage reducing the sensitivity of the sensing element to the condition to which it is subjected and also reducing the size of current pulse passing through the element, thereby contributing to long life of the element.

These and further objects of the present invention will be understood upon considering the following specifications and drawings of which:

Figure 1 shows schematically the electrical circuit of a burner control incorporating the improved flame detector; and Figure 2 shows graphically the characteristic curve of the flame sensing element of the Figure 1, plotting the sensitivity of the element as a function of the voltage applied to the element.

Referring specifically to Figure 1, a burner unit 10 is shown having an ignition transformer 11, a fuel valve 12, and a gas burner 13, which burner is grounded at ground connection 14.

The burner unit 10 is under the control of burner control circuit 15 having a transformer 16, a safety cutout device 17, a thermostat 18, and a burner control relay 19. This control circuit 15 is of the type shown in the John M. Wilson Patent 2,537,292. The burner relay 19 includes a winding 20, movable switch blades 21 and 22, and stationary contacts 23, 24, and 25. The movable switch blade 21 is normally biased by means not shown to be in engagement with stationary contact 24. Upon energization of relay 19 the movable switch blades 21 and 22 move into engagement with the stationary contacts 23 and 25 respectively.

The safety switch 17 includes a heater 26, a bimetal actuator 27, normally closed contacts 28 and 29, and manual reset actuator 30. The safety switch 17 is of the type which after a predetermined time period of energization of heater 26 causes bimetal 27 to warp to the right out from under contact 29 and contact 29 therefore disengages contact 28. After the bimetal 27 has cooled, the reset actuator 30 may be depressed to reset the contacts 28 and 29 to their normally engaged position.

A photosensitive Geiger tube 31 is shown positioned to be subjected to the wave energy emitted from the burner 13 when a flame is present at the burner. This Geiger tube consists of a vessel filled with gas containing two cold electrodes 32 and 33 respectively. As is well known, when a potential is applied between the electrodes 32 and 33 and when the Geiger tube is subjected to wave energy, pulses of current appear in the circuit external to the Geiger tube.

The tube 31 is connected by means of conductors 34 and 35 to an electronic flame detector. The electronic flame detector consists of electron discharge devices 37, 38, and 39, each of said devices having an anode 40, 41, and 42, a control electrode 43, 44, and 45 and a cathode 46, 47, and 48. The cathodes 46, 47, and 48 are heated by means of a normal filament type heater, not shown in Figure 1.

The first discharge device 37 receives its operating voltage from a battery 49 which is connected to the anode 40 through a resistor 50 and connected to the the cathode 46 through a resistor 51. The control electrode 43 of the discharge device 37 is connected to the cathode 46 through a resistor 52 in parallel with the series combination of a capacitor 53 and a resistor 54. A coupling capacitor 55 is provided to couple voltage pulses developed across resistor 50 to the control electrode 44 of discharge device 38.

The discharge device 38 receives its operating voltage from a battery 56 which is connected directly to the cathode 47 and, by means of a resistor 57 shunted by a capacitor 58, is connected to the anode 41 of discharge device 38. A biasing battery 59 is connected to the control electrode 44 through a resistor 60 and is provided to limit the current flow in the discharge device 38. As shown in Figure 1 the voltage of battery 59 is greater in magnitude than that of battery 56 to thereby provide a net negative voltage on the electrode 44 with respect to the cathode 47.

The voltage developed across resistor 57 paralleled by capacitor 58 is coupled to the discharge device 39 by means of a conductor 61 connected to the control electrode 45. The discharge device 39 receives its operating voltage from a battery 62 which is connected directly to the cathode 48 and is connected by means of a potentiometer 63 to the anode 42. The potentiometer 63 is provided with a first adjustable tap 64 and a second adjustable tap 65.

A flame relay 66 is provided having a winding 67, a movable switch blade 68, and stationary contacts 69 and 70. The movable switch blade 68 is biased, by means not shown, to engage stationary contact 70 when relay 66 is deenergized. The relay 66 is connected by means of a glow tube 71 to the adjustable tap 65 of the potentiometer 63 and by means of a conductor 72 to the lower tap of the potentiometer 63, which tap is grounded at ground connection 73.

Power is furnished to the control network 15 and to the burner unit 10 from conductors 74 and 75 connected to a source of power, not shown.

Referring to Figure 2, the sensitivity of the flame detector is shown plotted as a function of the voltage applied between the electrodes 32 and 33. As shown on Figure 2, in the no flame condition the voltage between the electrodes 32 and 33 is of a value $V_3$ and the sensitivity of the flame detector is at a value A. When flame is established the voltage between the electrodes 32 and 33 is reduced to a value $V_1$ at which voltage value the flame relay 66 drops out and the sensitivity of the flame detector is at a lower value C. Upon flame being extinguished, the voltage between the electrodes 32 and 33 increases until the voltage $V_2$ is reached. At this voltage the sensitivity of the flame detector is at a higher value B and the relay 66 pulls in. The exact manner in which the voltage on the Geiger tube 31 is adjusted to effect operation of the relay 66 and to effect the changing of the sensitivity of the electronic flame detector will be clear from the following description of the operation.

*Operation*

The apparatus of Figure 1 is shown in the standby condition, that is, with power applied to conductors 74 and 75 to energize the transformer 16 and with no flame present at the burner unit 10 so that the electronic flame detector is in the no flame condition. In this condition, no signal is present upon the control electrode 43 of the discharge device 37 and therefore no signal is present upon the control electrode 44 of the discharge device 38. The discharge device 38 therefore passes a given level of current depending upon the particular values of the circuit components which include the batteries 59 and 56. Normally this current will be relatively small and therefore a small voltage is developed across the capacitor 58 of a polarity as indicated on Figure 1.

The discharge device 39 which is controlled by the voltage on capacitor 58, therefore passes a fairly substantial current since the voltage between the cathode 48 and the control electrode 45 is the positive voltage of the battery 62 minus the voltage present on the capacitor 58. This relatively high current in flowing through the potentiometer 63 develops across the potentiometer 63 a relatively high voltage. The portion of the voltage between the ground connection 73 and the potentiometer tap 64 is the value $V_3$ as shown on Figure 2 and is the value of voltage present on the Geiger tube 31 in the no flame condition. The voltage present across the winding 67 of the flame relay 66 is proportional to this voltage $V_3$ and is the voltage developed from the ground connection 73 to the potentiometer tap 65. In the no flame condition this voltage is of a sufficient magnitude to fire the tube 71 to energize relay 66 thereby moving movable switch blade 68 into engagement with stationary contact 69. The tube 71 is provided to give positive action to the relay 66.

Assuming now that there is a call for heat, the thermostat 18 completes a connection from blade 80 to stationary contact 81. An energizing circuit can now be traced for the winding 20 of the relay 19. This circuit extends from the upper terminal of secondary 82 through conductor 83, contacts 29 and 28 of safety switch 17, conductor 84, stationary contact 81 and switch blade 80 of thermostat 18, conductor 85, winding 20, conductor 86, conductor 87, stationary contact 69 and movable switch blade 68 of relay 66, conductor 88, heater 26 of safety switch 17, and conductor 89 to the lower terminal of the secondary 82. It can be seen from this above traced circuit that the relay 19 will be energized only if the flame relay 66 is in the energized or no flame position and only if the heater 26 of the safety switch 17 is not burned out.

Energization of relay 19 causes the movable switch blade 21 to disengage stationary contact 24 and to move into engagement with stationary contact 23. When movable switch blade 21 engages stationary contact 23 a holding circuit is established for relay 19. This holding circuit can be traced from the upper terminal of secondary 82 through conductor 83, contacts 29 and 28 of safety switch 17, conductor 84, stationary contact 81 and movable blade 80 of thermostat 18, conductor 85, winding 20, conductor 86, stationary contact 23 and movable switch blade 21 of relay 19, and conductor 90 to the center tap 91 of secondary 82.

When movable switch blade 21 engages stationary contact 23 the heater 26 of the safety switch 17 is maintained energized through a circuit which can be traced from center tap 91 of transformer 82 through conductor 90, movable switch blade 21 and stationary contact 23 of relay 19, conductor 87, stationary contact 69 and movable switch blade 68 of relay 66, conductor 88, heater 26, and conductor 89 to the lower terminal of secondary 82.

Further, when relay 19 is energized the movable switch blade 22 is moved into engagement with stationary contact 25. An energizing circuit is now completed for the burner unit 10 and can be traced from the power line conductor 74 through conductor 92, stationary contact 25 and movable switch blade 22 of relay 19, conductor 93, valve 12 in parallel with ignition transformer 11, and conductor 94 to power line conductor 75. The valve 12 is now energized and fuel flows to the burner 13 to be ignited by ignition transformer 11.

Flame is normally established at this time and with a flame present at the burner 13 wave energy is emitted from the flame and impinges upon Geiger tube 31. This wave energy in passing through the Geiger tube 31 causes discharges to occur. As these discharges occur pulses of current flow through the conductors 34 and 35 and this current develops a pulsating signal across resistor 54. Upon tracing this circuit it can be seen that the upper end of resistor 54 becomes negative with respect to the lower end of this resistor. This negative signal is applied to the control electrode 43 of the discharge device 37 and is amplified by this device. The amplified signal is applied to the control electrode 44 of the discharge device 38 as a positive signal. With this signal present on the control electrode 44 the discharge device 38 passes a greater amount of current. This greater amount of current develops a higher voltage across the resistor 57 and therefore the capacitor 58 charges to a greater extent than it is charged in the no flame condition.

Considering discharge device 39, it can be seen that the voltage between the control electrode 45 and the cathode 48 is now more negative and therefore the current flowing through the potentiometer 63 is decreased. With a reduced current flowing through the potentiometer 63 the voltage supplied to the flame relay 66 is reduced and the voltage supplied to the electrodes 32 and 33 of the Gieger tube 31 is also reduced.

After a given number of ionizing events have passed through the Geiger tube 31 due to a flame at the burner 13, the charge on the capacitor 58 has built up to a value which causes the voltage across the electrodes 32 and 33 of the Geiger tube 31 to be lowered to the value $V_1$ shown in Figure 2. With this lower voltage on Geiger tube 31 the tube can no longer detect the flame at the burner 13 and also due to the low voltage across the potentiometer 63 the flame relay 66 drops out. Since the Geiger tube 31 no longer detects flame at the burner 13 a signal will not be present at electrode 44 and the charge on the capacitor 58 will gradually leak off. As this charge leaks off the potential across the potentiometer 63 builds up to a point where the Geiger tube 31 is again sensitive to detect a flame at the burner 13 and a signal is again applied to the flame detector to cause the capacitor 58 to be charged and again render the Geiger tube 31 insensitive to flame at the burner 13. It can therefore be seen that the voltage applied to the Geiger tube 31 in the flame condition will fluctuate about the value $V_1$. However, the voltage $V_2$ at which the flame relay 66 pulls in has been selected such that the voltage across the Geiger tube 31 will not increase to this value when there is a flame present at the burner unit 10.

When the flame relay 66 is deenergized, as it is when the flame detector detects flame, the movable switch blade 68 disengages the stationary contact 69 to break the above trace energizing circuit for the heater 26 of the safety switch 17 and engages the stationary contacts 70 which contact is in a component checking circuit to be pointed out later. The apparatus of Figure 1 is now at its normal operating condition.

*Flame failure*

If a flame now fails at the burner 13, the Geiger tube 31 can no longer cause a signal to be developed at the input of the flame detector and the voltage across the capacitor 58 will leak off until the discharge device 39 passes sufficient current to develop a voltage of $V_2$ between the ground connection 73 and the potentiometer tap 64. As has been pointed out, this voltage $V_2$ is proportional to the voltage across the winding 67 of the flame relay 66 and is of a value such that the flame relay now pulls in. With the flame relay 66 energized movable switch blade 68 engages stationary contact 69 and the energizing circuit above traced for the heater 26 of safety switch 17 is again completed. After a predetermined length of time the bimetal 27 warps out from under contact 29 and contact 29 disengages contact 28 to break the energizing circuit for relay 19 and for safety switch heater 26. After a predetermined length of time the bimetal 27 will cool and actuator 30 may be manually depressed to reset contacts 28 and 29 to their engaged position.

If at this time there is still a call for heat, relay 19 will again be energized and an attempt will be made to establish flame at the burner unit 13 as above described. If this attempt is unsuccessful the safety switch 17 will again be actuated to deenergize relay 19 thereby deenergizing burner unit 10.

A component checking circuit is provided to insure proper operation of the flame detector. This can be seen by considering the apparatus in the no flame condition with relay 19 deenergized and with relay 66 energized. If a fault now occurs in the flame detector, for example, device 39 fails, then relay 66 is deenergized and an energizing circuit is established for heater 26 of safety switch 17 as movable switch blade 68 of relay 66 engages contact 70. This circuit can be traced from center tap 91 of secondary 82 through conductor 90, movable switch blade 21 and stationary contact 24 of relay 19, conductor 100, stationary contact 70 and movable switch blade 68 of relay 66, conductor 88, safety switch heater 26, and conductor 89 to the lower tap of secondary 82. This above traced circuit is effective to cause safety switch 17 to operate to open the circuit which is adapted to energize relay 19 upon a call for heat. It should also be noted that if thermostat 18 calls for heat before the safety switch has had time to operate, relay 19 cannot be energized since the above traced initial energizing circuit for this relay is open at contact 69 of the flame relay.

From the foregoing it can be seen that there has been provided a new and improved condition sensing apparatus and in particular, a flame detector which utilizes a flame sensing means which is sensitive to a variety of types of flames and which functions with the novel flame detector to provide an indication of flame. While many modifications will be obvious to those skilled in the art, it is intended that the invention be limited solely by the scope of the appended claims.

I claim as my invention:

1. A flame sensing apparatus comprising; amplifier means having an input resistor connected one end to a reference potential and the other end to the control electrode of a first electron discharge device and having an output resistor connected one end to said reference potential and the other end to the anode of a second electron discharge device, said output resistor having a variable tap; means including a third electron discharge device connecting said first discharge device to said second discharge device to cause a normal voltage to appear across said output resistor when no signal voltage is present across said input resistor and to cause a lower voltage to appear across said output resistor when a signal voltage is present across said input resistor; Geiger counter flame sensing means, circuit means connecting said Geiger counter to said other end of said input resistor and to said variable tap of said output resistor to thereby apply to said counter an operating voltage proportional to said normal voltage across said output resistor, said adjustable tap being positioned on said output resistor so that said operating voltage prevents said Geiger counter from counting in the absence of flame to be sensed, said amplifier means when said counter is subjected to a flame reducing said operating voltage to an average operating voltage at which said counter is prevented from counting, and voltage responsive means connected to said output resistor.

2. A flame detector comprising, flame sensing means; an amplifier having an output load and an input circuit, said input circuit having a first input terminal and having a second input terminal which is common to said input circuit and to said output load, a plurality of electron discharge devices within said amplifier each having a control electrode and an anode; biasing means connected to the control electrode of a first of said discharge devices to normally limit the anode current of said first device, means connecting the input circuit of said amplifier to the control electrode of said first discharge device so that the anode current of said first device increases upon a signal being applied to the input circuit of said amplifier, means connecting the anode of said first discharge device to the control electrode of a second of said plurality of discharge devices to thereby apply a control voltage to said second discharge device in accordance with the anode current of said first discharge device to thereby reduce the anode current of said second discharge device upon a signal being applied to the input circuit of said amplifier, means connecting said output load to the anode of said second discharge device; circuit means connecting said flame sensing means to said output load and to said first input terminal to thereby impress an operating voltage upon said flame sensing means in accordance with the anode current of said second discharge device and to impress a signal voltage upon the input circuit of said amplifier when said flame sensing means is subjected to a flame, and voltage responsive means connected to said amplifier.

3. A flame detector comprising; amplifier means having a first and a second input terminal and an output load, said output load being connected to said first input terminal, a plurality of electron discharge devices connected in said amplifier to normally cause a voltage to appear across said output load and to cause said voltage to decrease in magnitude upon a signal voltage being applied to said input terminals; flame sensing means including a pair of electrodes disposed in a gaseous chamber which ionizes to allow current to pass between said electrodes upon said chamber being subjected to wave energy emitted by a flame; circuit means connecting the first of said electrodes to said second input terminal and the second of said electrodes to said output load to thereby apply said voltage across said load to said pair of electrodes and to thereby apply a signal voltage to said input terminals upon said flame sensing means being subjected to flame, and voltage responsive means connected to said load and responsive to a decrease in voltage across said load upon said flame sensing means being subjected to flame.

4. A flame detector comprising, a Geiger tube adapted to be exposed to the wave energy emitted by a flame to be detected, amplifier means having an input circuit and an output load, said output load having a voltage normally impressed thereon by said amplifier means in accordance with the voltage applied to said input circuit, said amplifier means being effective upon a signal being applied to said input circuit to reduce the normal voltage across said load, voltage responsive means connected to said load having a first or a second condition of operation in accordance with said normal or said reduced voltage being present across said load, and energizing circuit means for said Geiger tube including said input circuit connecting said Geiger tube to said load to apply an operating voltage to said tube in accordance with the normal voltage across said load and to apply a signal voltage to said input circuit in accordance with the condition to which said Geiger tube is exposed, said normal voltage across said load rendering said Geiger tube sensitive to the wave energy emitted by a flame to cause a signal voltage to be impressed upon said input circuit to thereby reduce said normal voltage to an average value at which said Geiger tube is not sensitive to flame.

5. A flame detector comprising; flame sensing means having a gaseous chamber and a pair of electrodes forming a gap within said chamber, said chamber becoming ionized so that electrical current can flow across said gap upon said flame sensing means being subjected to wave energy emitted by flame; amplifier means having a plurality of electron discharge devices each having a control electrode and an anode, an input impedance for said amplifier having one end thereof connected to a reference potential, means connecting the other end of said input impedance to the control electrode of a first of said discharge devices to thereby cause the anode current of said first device to increase upon a signal voltage being applied to said input impedance, means connecting the anode of said first discharge device to the control electrode of a second of said discharge devices to thereby cause the anode current of said second device to decrease upon a signal voltage being applied to said input impedance, a load impedance for said second discharge device connected one end to the anode of said second discharge device and the other end to said reference potential; circuit means connecting one of said electrodes of said flame sensing means to said other end of said input impedance and connecting the other of said electrodes to said other end of said load impedance so that an operating voltage proportional to the anode current of said second discharge device is applied between said electrodes, said operating voltage rendering said flame sensing means sensitive to flame to cause a signal voltage to be applied across said input impedance when said flame sensing means is subjected to flame to thereby cause the operating voltage of said flame sensing means to be lowered to a point where said flame sensing means is insensitive to the wave energy emitted by a flame, and voltage responsive means connected to said amplifier means.

6. A condition sensing apparatus comprising, a Geiger tube sensing element; amplifier means having an input impedance one end of which is connected to a reference potential and an output impedance one end of which is connected to said reference potential, a plurality of electron discharge devices within said amplifier means and connected to said input impedance and to said output impedance to produce a normal magnitude of voltage across said output impedance when no input signal voltage is present across said input impedance and to produce a lower magnitude of voltage across said output impedance when an input signal is present across said input impedance; circuit means connecting said sensing element to the other end of said input impedance and to the other end of said output impedance so that a voltage is applied to said Geiger tube which is proportional to the voltage across said output impedance, said Geiger tube when subjected to a condition wherein wave energy passes through said tube causing a signal voltage to appear across said input impedance and said amplifier means thereby causing the voltage applied to said tube to decrease and thereby lower the sensitivity of said tube to such wave energy, and voltage responsive means connected to said amplifier means.

7. A flame detector comprising, amplifier means having an input circuit and an output circuit, said output circuit having an output voltage thereon which is indicative of the voltage applied to said input circuit, said output circuit and said input circuit each having a pair of terminals, one of said terminals for said input circuit being common to one of said terminals for said output circuit; flame sensing means, circuit means connecting said flame sensing means to the other of said terminals of said input circuit and to the other of said terminals of said output circuit to thereby apply to said flame sensing means said output voltage of said amplifier means; and voltage responsive means connected to said amplifier means to be controlled by said amplifier means in accordance with the condition to which said flame sensing means is subjected.

8. Condition sensing apparatus comprising; amplifier means having input means and output means, said output means having an output voltage thereon of a value indicative of the magnitude of voltage applied to said input means, condition sensing means of the type whose sensitivity is proportional to the voltage applied thereto, means connecting said condition sensing means to the input means of said amplifier means to apply an input voltage to said input means, and means including the output means of said amplifier to supply operating voltage to said condition sensing means in accordance with the magnitude of said output voltage, said condition sensing means upon being subjected to a given condition applying a signal to the input means of said amplifier means to as a consequence thereof reduce the operating voltage of said condition sensing means so that said condition sensing means is relatively insensitive to the condition to which it is subjected.

9. Condition sensing apparatus comprising, amplifier means having an input and an output with an output voltage normally appearing at said output, condition sensing means adapted to be exposed to a condition to be sensed, and circuit means connecting said input, said output, and said condition sensing means in a series circuit to apply said output voltage to said condition sensing means as an operating voltage.

10. A flame detector comprising, amplifier means having an input impedance means and output impedance means with an output voltage developed across said output impedance means in accordance with the input signal across said input impedance means, flame sensing means whose sensitivity to flame varies with the operating voltage applied to said flame sensing means, circuit means connecting said input impedance means, said output impedance means, and said flame sensing means in a series circuit to apply said output voltage to said flame sensing means as an operating voltage to thereby cause the sensitivity of said flame sensing means to change when said flame sensing means is exposed to the effects of a flame, and voltage responsive means connected to said amplifier.

References Cited in the file of this patent

UNITED STATES PATENTS

| | | |
|---|---|---|
| 2,304,641 | Jones | Dec. 8, 1942 |
| 2,443,857 | Herzog | June 22, 1948 |
| 2,507,359 | Weisz | May 9, 1950 |
| 2,537,292 | Wilson | Jan. 9, 1951 |